(12) United States Patent
Miyazaki et al.

(10) Patent No.: US 11,777,121 B2
(45) Date of Patent: Oct. 3, 2023

(54) POWER SYSTEM, VEHICLE, VEHICULAR POWER CONTROL METHOD, AND CONTROL METHOD FOR POWER SYSTEM

(71) Applicant: HONDA MOTOR CO.,LTD., Tokyo (JP)

(72) Inventors: Junya Miyazaki, Saitama (JP); Nobutaka Nakajima, Saitama (JP); Kento Takeuchi, Saitama (JP); Kenji Taruya, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/679,112

(22) Filed: Feb. 24, 2022

(65) Prior Publication Data

US 2022/0320548 A1 Oct. 6, 2022

(30) Foreign Application Priority Data

Mar. 30, 2021 (JP) .................................. 2021-057610

(51) Int. Cl.
| | | |
|---|---|---|
| *H01M 8/04746* | (2016.01) | |
| *H01M 8/04014* | (2016.01) | |
| *H01M 8/04029* | (2016.01) | |
| *H01M 8/249* | (2016.01) | |
| *H01M 8/04701* | (2016.01) | |

(52) U.S. Cl.
CPC ... *H01M 8/04768* (2013.01); *H01M 8/04014* (2013.01); *H01M 8/04029* (2013.01); *H01M 8/04738* (2013.01); *H01M 8/249* (2013.01); *H01M 2250/20* (2013.01)

(58) Field of Classification Search
CPC ......... H01M 8/04768; H01M 8/04014; H01M 8/04029; H01M 8/04738; H01M 8/249; H01M 2250/20; H01M 8/04007; H01M 8/2465

See application file for complete search history.

(56) References Cited

U.S. PATENT DOCUMENTS

| | | | |
|---|---|---|---|
| 2010/0273079 A1 | 10/2010 | Hinsenkamp | |
| 2017/0214069 A1* | 7/2017 | Hoshi | H01M 8/04067 |
| 2018/0145355 A1* | 5/2018 | Fujioka | H01M 8/04686 |
| 2018/0301722 A1* | 10/2018 | Kozuka | H01M 8/04835 |
| 2019/0305333 A1 | 10/2019 | Sato | |
| 2020/0198437 A1* | 6/2020 | Nagaoka | H01M 10/663 |

FOREIGN PATENT DOCUMENTS

| | | |
|---|---|---|
| JP | 2004165101 A | 6/2004 |
| JP | 2011503812 A | 1/2011 |
| JP | 2020053287 A | 4/2020 |
| JP | 2021111488 A | 8/2021 |
| JP | 2022116990 A | 8/2022 |

OTHER PUBLICATIONS

Office Action issued for counterpart Japanese Application No. 2021-057610, issued by the Japanese Patent Office dated Nov. 22, 2022 (drafted on Nov. 9, 2022).

\* cited by examiner

*Primary Examiner* — Stewart A Fraser (57) ABSTRACT

A power system comprises a fuel cell system having a fuel cell stack and a fuel cell water pump, a heat source having a heat source water pump and configured to be actuated to generate heat, a heat radiator for exchanging heat with the atmosphere, a cooling passage thermally connecting the fuel cell system, the heat source, and the heat radiator, and a controller for controlling the fuel cell system, the heat source, and the heat radiator, and the cooling passage.

20 Claims, 8 Drawing Sheets

FIG.1

<THE FIRST EXAMPLE>

| | FCS1 | FCS2 | FCS3 | FCS4 | RETARDER |
|---|---|---|---|---|---|
| RETARDER OFF | THE SECOND ROTATION SPEED | THE SECOND ROTATION SPEED | THE SECOND ROTATION SPEED | THE SECOND ROTATION SPEED | THE THIRD ROTATION SPEED |
| RETARDER ON | THE FIRST ROTATION SPEED | THE FIRST ROTATION SPEED | THE FIRST ROTATION SPEED | THE FIRST ROTATION SPEED | THE FOURTH ROTATION SPEED |

FIG.2

<THE SECOND EXAMPLE>

| | FCS1 | FCS2 | FCS3 | FCS4 | RETARDER |
|---|---|---|---|---|---|
| RETARDER OFF | THE FIRST ROTATION SPEED | THE SECOND ROTATION SPEED | THE SECOND ROTATION SPEED | THE SECOND ROTATION SPEED | THE THIRD ROTATION SPEED |
| RETARDER ON | THE SECOND ROTATION SPEED | THE FIRST ROTATION SPEED | THE FIRST ROTATION SPEED | THE FIRST ROTATION SPEED | THE FOURTH ROTATION SPEED |

*FIG.3*

<PATTERNS OF COLLABORATIVE CONTROL>

| | (1) | (2) | (3) | (4) | (5) | (6) | (7) | (8) | (9) | (10) | (11) | (12) |
|---|---|---|---|---|---|---|---|---|---|---|---|---|
| FOS1 | × | ○ | ○ | ○ | × | × | × | ○ | ○ | ○ | × | ○ |
| FOS2 | × | ○ | × | × | ○ | ○ | × | ○ | ○ | × | ○ | ○ |
| FOS3 | × | × | ○ | × | ○ | × | ○ | ○ | × | ○ | ○ | ○ |
| FOS4 | × | × | × | ○ | × | ○ | ○ | × | ○ | ○ | ○ | ○ |

POWER SYSTEM, VEHICLE, VEHICULAR POWER CONTROL METHOD, AND CONTROL METHOD FOR POWER SYSTEM

The contents of the following Japanese patent application(s) are incorporated herein by reference:
NO. 2021-057610 filed on Mar. 30, 2021.

BACKGROUND

Technical Field

The present invention relates to a power system, a vehicle, a vehicular power control method, and a control method for the power system.

Related Art

In the patent document 1, "a fuel cell drive for an automotive, particularly a commercial vehicle, comprising a fuel cell system as an energy source and a fuel cell cooling system for cooling to allow controlling the fuel cell system according to a load" is described.
Patent Document 1: Japanese Translation of PCT International Publication No. 2011-503812

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
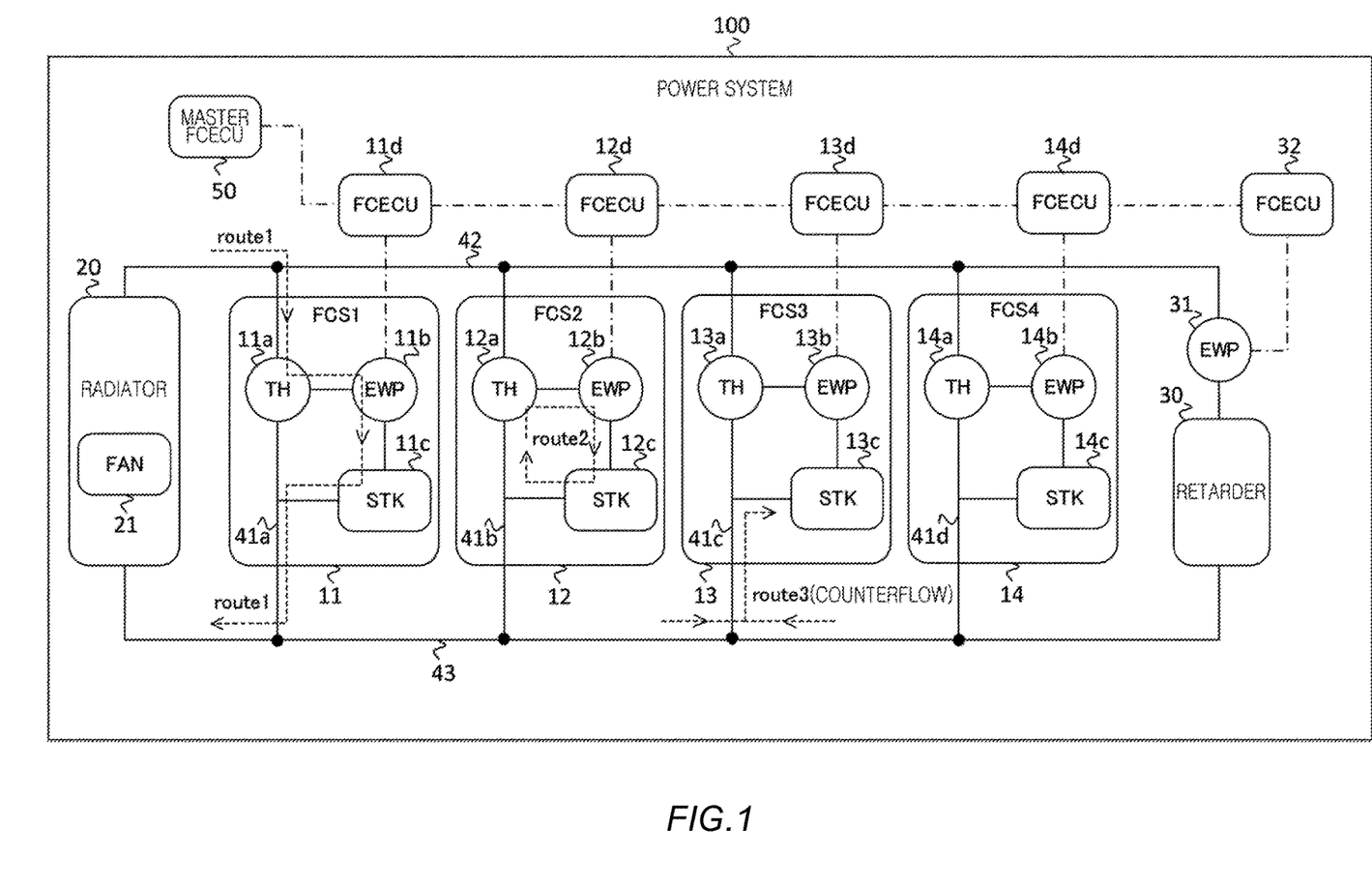
FIG. 1 is a diagram that shows a schematic configuration of a power system 100 in the first embodiment.

FIG. 1 is a diagram that shows a schematic configuration of a power system 100 in the first embodiment. As shown in FIG. 1, the power system 100 has a fuel cell system (FCS 1) 11, a fuel cell system (FCS 2) 12, a fuel cell system (FCS 3) 13, a fuel cell system (FCS 4) 14, a radiator 20, and a retarder 30. Fuel cell system 11, fuel cell system 12, fuel cell system 13, and fuel cell system 14 connects to an FCECU11d, an FCECU 12d, an FCECU 13d, and an FCECU 14d respectively. The retarder 30 connects to a water pump (EWP) 31 and an FCECU 32. The FCECUs 11d to 14d and the FCECU 32 connect to a master FCECU 50 as a controller. Although not shown in the drawing, the master FCECU 50 is connected to an ECU that controls an apparatus on which the power system 100 is loaded.

The power system 100 is loaded on, for example, a vehicle such as a fuel cell vehicle. The vehicle is, for example, a heavy vehicle such as a heavy truck. The vehicle is driven by acquiring driving force from a plurality of fuel cell systems 11 to 14 of the power system 100. A heavy vehicle such as a heavy truck is smoothly driven by having driving force of a plurality of fuel cell systems 11 to 14. It should be noted that the vehicle may be a small vehicle, may be loaded on a movable body other than a vehicle (e.g. a vessel, a flight vehicle, a robot), and may also be loaded on a stationary fuel cell system. In the present embodiment, although the number of fuel cell systems that the power system 100 has is four, which are the fuel cell systems 11 to 14, it may be four or more, and may be four or less.

Although omitted in the present embodiment, the fuel cell systems 11 to 14 may have other configurations. Other configurations may include, for example, an FCVCU (Fuel Cell Voltage Control Unit), a BATTVCU (BATTERY Voltage Control Unit), a PDU (Power Drive Unit) 13a, an MOT (MOTER), a high-voltage auxiliary machine, an IPU (Intelligent Power Unit), or the like.

The fuel cell system 11 has a thermo valve (TH) 11a, a water pump (EWP) 11b, and a fuel cell stack (STK) 11c. Similarly, the fuel cell system 12 has a thermo valve (TH) 12a, a water pump (EWP) 12b, and a fuel cell stack (STK) 12c. The fuel cell system 13 has a thermo valve (TH) 13a, a water pump (EWP) 13b, and a fuel cell stack (STK) 13c. The fuel cell system 14 has a thermo valve (TH) 14a, a water pump (EWP) 14b, and a fuel cell stack (STK) 14c.

In FIG. 1, cooling passages for cooling fuel cell stacks 11c to 14c are indicated by solid lines. The cooling passages thermally connect fuel cell systems 11 to 14, a radiator 20, and a retarder 30 by means of piping. Coolant fluid for cooling the fuel cell stacks 11c to 14c circulates in the cooling passages. The cooling passages have main flow channels 41a to 41d and bypass flow channels 42, 43.

The main flow channels 41a to 41d are flow channels, where coolant fluid flows into the fuel cell systems 11 to 14 when the thermo valves 11a to 14a are in the open state, and passes through the fuel cell water pumps 11b to 14b and the fuel cell stacks 11c to 14c to flow out to the exterior of the fuel cell systems 11 to 14. The bypass flow channels 42, 43 are flow channels, where coolant fluid circulates in the exterior of the fuel cell systems 11 to 14 without passing through the fuel cell water pumps 11b to 14b of the fuel cell systems 11 to 14 and the fuel cell stacks 11c to 14c, when the thermo valves 11a to 14a are in the closed state. The bypass flow channel 42 is a flow channel where coolant fluid is directed from the radiator 20 to the retarder 30. The bypass flow channel 43 is a flow channel where coolant fluid is directed from the retarder 30 to the radiator 20. As shown in FIG. 1, a plurality of fuel cell systems 11 to 14 and the retarder 30 are parallelly connected on the cooling passages respectively.

The fuel cell stacks 11c to 14c are configured by multi-layering fuel cell units which are configured by interposing solid polyelectrolyte membranes formed of, for example, solid polymer ion exchange membranes or the like between both sides of anode and cathode, and comprise fuel electrode supplied with anode gas as fuel gas, air electrode supplied with air containing oxygen as cathode gas, and cooling passage supplied with coolant fluid. Hydrogen ion generated by catalytic reactions at the anode passes through solid polyelectrolyte membranes to move to the cathode so as to cause, at the cathode, electrochemical reactions with oxygen producing electricity and water. Also, in order to avoid the temperature of the fuel cell stacks 11c to 14c from being higher than an upper-limit temperature due to the generation of heat following this production of electricity, coolant fluid flowing in the cooling passages functions to cool the fuel cell stacks 11c to 14c by removing the heat.

The water pumps 11b to 14b are driven by high-voltage batteries or motor regenerated energy to circulate coolant fluid in the cooling passages.

The thermo valves 11a to 14a open the passages to let cooling water flow in from the bypass flow channel 42 when cooling the fuel cell stacks 11c to 14c. Also, except for when cooling the fuel cell stacks 11c to 14c, the thermo valves 11a to 14a block the passages from the bypass flow channel 42 to prevent cooling water from flowing in. The thermo valves 11a to 14a are provided with temperature sensors, which are not shown in the drawing, and automatically open and close on the basis of the temperature of cooling water around the thermo valves 11a to 14a. Specifically, when the temperature of coolant fluid around the thermo valves 11a to 14a is lower than a predefined temperature, there is no need to cool coolant fluid, and thus the passage is blocked to prevent cooling water from flowing in from the bypass flow channel 42. On the other hand, when the temperature of coolant fluid is higher than the predefined temperature, there is a need to cool coolant fluid, and thus the passage is opened to let cooling water flow in from the bypass flow channel 42. The predefined temperature is, for example, 75° C.

The radiator 20 is a cooling component that exchanges heat between a heating medium and ambient air. The radiator 20 has a FAN 21, which is a heat radiator.

The retarder 30 is a control mechanism of the vehicle on which the power system 100 is loaded. In a heavy vehicle such as a heavy truck, since disc brakes cannot provide enough braking capability, brakes which take their weights into account are not normal disc brakes but hydrodynamic brakes or magnetic brakes called retarders are employed. In the present embodiment, the retarder 30 is a hydrodynamic retarder. The circulation of fluid between a rotor and a stator by rotating the rotor of the hydrodynamic retarder generates resistance in the fluid, allowing braking force of the vehicle to be acquired due to the generated resistance. Although the retarder 30 is described as a heat source in the present embodiment, the heat source may be any heat source other than a retarder, as a component corresponding to a retarder.

The FCECUs 11d to 14d and the FCECU 32 are computers including microcomputers, comprising CPUs, ROMs, and RAMs, as well as input-output devices such as A/D converters, and D/A converters, timers as timing units, or the like. In the FCECUs 11d to 14d and the FCECU 32, CPUs read and perform programs stored in ROMs.

The FCECUs 11d to 14d are configured to perform the energy management of the fuel cell systems 11 to 14. The FCECU 32 is configured to perform the energy management of the retarder 30. The reading and performing of programs stored in ROMs by CPUs makes the FCECUs 11d to 14d and the FCECU 32 perform programs stored on ROMs and detect, for example, sensor detected values of sensors such as opening degree sensors, pressure sensors, flow sensors, temperature sensors, rotation speed sensors of air pumps, which are not shown in the drawings, voltage or current of fuel cell stacks, voltage, current, rotation speed of air pumps, voltage, current, rotation speed of motors, or the like, so as to control each equipment.

The FCECUs 11d to 14d and the FCECU 32 are more integrally managed by the master FCECU 50 as a controller. The FCECUs 11d to 14d and the FCECU 32 control each apparatus in response to the instruction from the master FCECU 50. The master FCECU 50 controls the rotation speed of the water pumps 11b to 14b based on at least one of the actuation state of the fuel cell systems 11 to 14, the actuation state of the retarder 30, and the open and closed state of the thermo valves 11a to 14a. The master FCECU 50 determines the number of each fuel cell system 11 to 14 that needs to be actuated according to the output requested by the power system 100. The FCECU 32 may be installed outside of the power system 100, or loaded as a function of the ECU that controls the vehicle on which the power system 100 is loaded, and may be configured to control the retarder 30 by the instruction from the ECU that controls the vehicle on which the power system 100 is loaded, and to control the EWP 31, based on the signals from the master FCECU 50, by the instruction from the ECU that controls the vehicle on which the power system 100 is loaded.

The circulation passage of cooling water when the thermo valve 11a is open is shown as route 1, which is indicated by a broken line in the fuel cell system 11 and exemplifies the circulation passages. While the thermo valve 11a is open, coolant fluid for cooling the fuel cell stack 11c flows from the bypass flow channel 42 into the interior of the fuel cell system 11, and passes through the thermo valve 11a. Then, coolant fluid is supplied to the fuel cell stack 11c by the pressure raised by the water pump 11b, and cools the fuel cell stack 11c by removing the heat from the fuel cell stack 11c when passing through the cooling passage in the fuel cell stack 11c. Then, the heated coolant fluid flows to the bypass flow channel 43 (route 1). The heated coolant fluid is sent to the radiator 20, and the coolant fluid is cooled by radiating the heat to the exterior by the FAN 21 of the radiator 20. Also for other fuel cell systems 12, 13, 14, the circulation passages of coolant fluid when the thermo valves 12a, 13a, 14a are open are the same as that of the fuel cell system 11.

The circulation passage of coolant fluid when the thermo valve 12a is closed is shown as route 2, which is indicated by a broken line in the fuel cell system 12 and exemplifies the circulation passages. While the thermo valve 12a is closed, coolant fluid flows in such a way as to circulate among the thermo valve 12a, the water pump 12b, and the fuel cell stack 12c, in the interior of the fuel cell system 12 (route 2). Also for other fuel cell systems 11, 13, 14, the circulation passages of coolant fluid when the thermo valves 11a, 13a, 14a are closed are the same as that of the fuel cell system 12.

Depending on the setting of the rotation speed of the water pumps 11b to 14b of each fuel cell system 11 to 14 and the setting of the rotation speed of the water pump 31 of the retarder 30, coolant fluid may flow backward without flowing in a normal direction in the circulation passages. The circulation passage of coolant fluid when the coolant fluid is flowing backward is shown as route 3, which is indicated by a broken line in the fuel cell system 13 and exemplifies the circulation passages. Coolant fluid flows from the bypass flow channel 43 into the fuel cell system 13, and flows into the fuel cell stack 13c (route 3). Also for other fuel cell systems 11, 12, 14, the counterflow passages of coolant fluid are the same as that of the fuel cell system 13.

The counterflow of coolant fluid results in the following problems. Firstly, although there will be a need to arrange a non-return valve to each fuel cell system 11 to 14 respectively in order to prevent the counterflow of coolant fluid, the arrangement of a non-return valve to each fuel cell system 11 to 14 will increase the production costs of the power system 100. Secondly, in an embodiment in which the non-return valves are not arranged, since there will be a need to maximize the drive of each of the water pumps 11b to 14b to cool while focusing on the prevention of the counterflow, the fuel efficiency of the system as a whole becomes worse. Thirdly, the counterflow of coolant fluid causes the fluid rate of coolant fluid in each fuel cell system 11 to 14 to vary, resulting in dew condensation and desiccation. In the first embodiment, in order to prevent the counterflow of coolant fluid, the rotation speed of the water pumps 11b to 14b of each fuel cell system 11 to 14, and the rotation speed of the water pump 31 of the retarder 30 are controlled.

Figure 2:
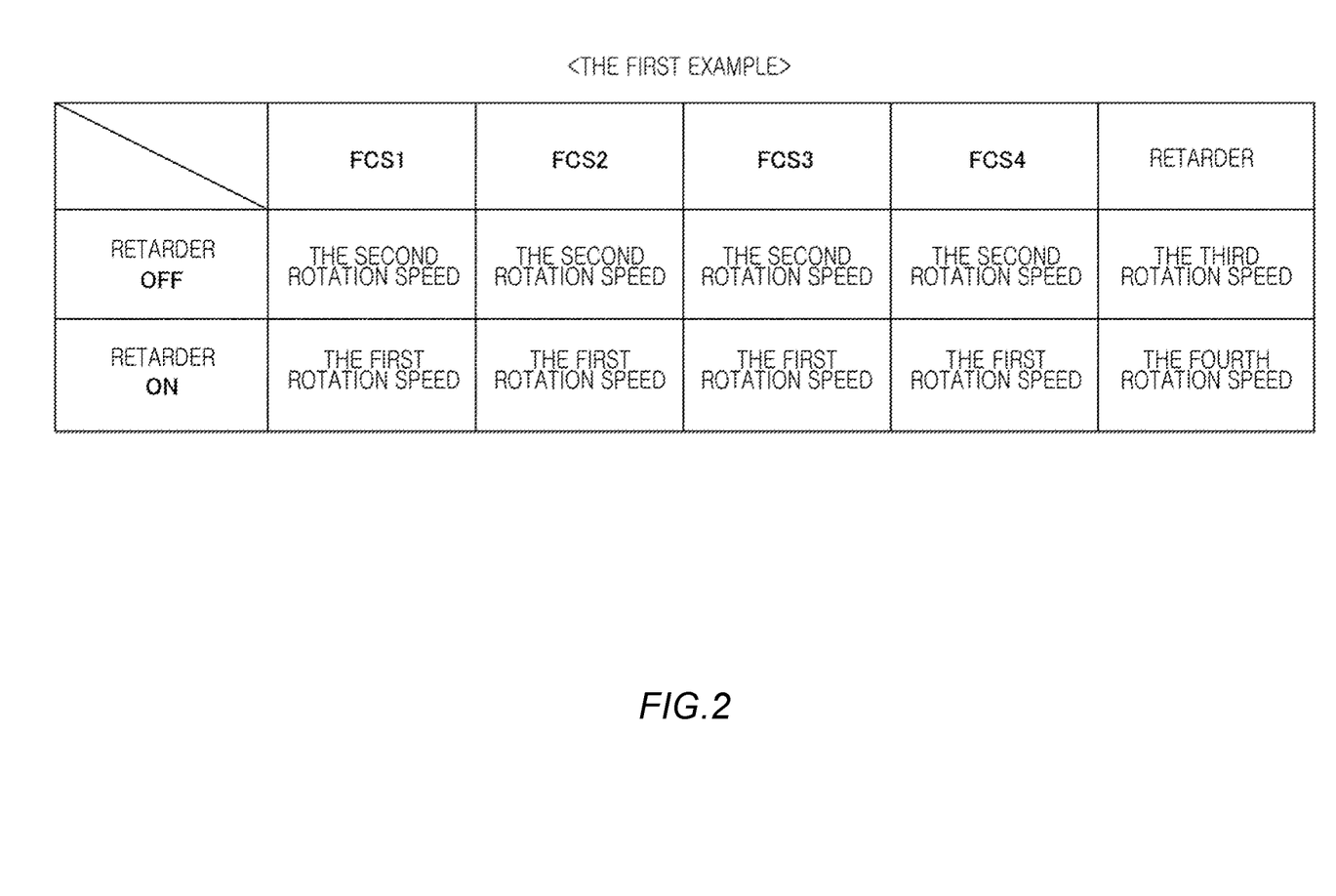
FIG. 2 is a diagram that shows the first example of each fuel cell system 11 to 14 and the rotation speed control of a water pump of a retarder 30 in the first embodiment.

FIG. 2 is a diagram that shows the first example of each fuel cell system 11 to 14 and the rotation speed control of a water pump of a retarder 30 in the first embodiment. In the normal control, in order to enhance cooling efficiency, while the retarder 30 is being actuated, the rotation speed of the water pumps 11b to 14b of each fuel cell system 11 to 14 is decreased to perform the control to decrease the electricity output of each fuel cell system 11 to 14. However, if the rotation of the water pumps 11b to 14b of each fuel cell system 11 to 14 happens to be completely stopped, the counterflow of coolant fluid shown by route 3 in FIG. 1 occurs. Therefore, in the first example, in order to prevent the counterflow of coolant fluid, while the retarder 30 is being actuated, the control to rotate the water pumps 11b to 14b in a predefined minimum rotation speed is performed.

Specifically, the master FCECU 50 controls the rotation speed of the water pumps 11b to 14b of each fuel cell system 11 to 14 by switching between the first rotation speed leading to the first discharge flow rate, wherein the discharge flow rate of coolant fluid from the water pumps 11b to 14b is a minimum discharge flow rate per a predefined unit time, and the second rotation speed leading to the second discharge flow rate, which is greater than the first discharge flow rate. The first rotation speed and the second rotation speed are determined by taking into account the condition of the retarder 30 regarding whether the retarder 30 is actuated or not, and the rotation speed of the water pump 31 of the retarder 30. The first rotation speed is, for example, 4500 rpm.

The master FCECU 50 controls the rotation speed of the water pumps 11b to 14b to the second rotation speed when the retarder 30 is not being actuated (when it is off). On the other hand, the master FCECU 50 controls the rotation speed of the water pumps 11b to 14b to the first rotation speed when the retarder 30 is being actuated (when it is on). Therefore, regardless of the condition of the retarder 30 regarding whether the retarder 30 is actuated or not, the water pumps 11b to 14b rotate within the range at which does not go below the first rotation speed leading to the first minimum discharge flow rate per a predefined unit time.

Furthermore, the retarder 30 is not being actuated during normal driving, only each fuel cell system 11 to 14 is being actuated. However, if the rotation of the water pump 31 of the retarder 30 happens to be completely stopped when the retarder 30 is not being actuated, the counterflow of coolant fluid occurs around the retarder 30. Therefore, in the present embodiment, in order to prevent the counterflow of coolant fluid around the retarder 30, while each fuel cell system 11 to 14 is being actuated, the control to rotate the water pump 31 of the retarder 30 in a predefined rotation speed is performed.

Specifically, the master FCECU 50 controls the rotation speed of the water pump 31 of the retarder 30 by switching between the third rotation speed leading to the third discharge flow rate, wherein the discharge flow rate of coolant fluid from the retarder 30 is a minimum discharge flow rate per a predefined unit time, and the fourth rotation speed leading to the fourth discharge flow rate, which is greater than the third discharge flow rate. The third rotation speed and the fourth rotation speed are determined by taking into account the rotation speed of the water pumps 11b to 14b of each fuel cell system 11 to 14 and the temperature of coolant fluid around the retarder 30. The third rotation speed is, for example, 3000 rpm.

The master FCECU 50 controls the rotation speed of the water pump 31 to the third rotation speed when the retarder 30 is not being actuated (when it is off). The master FCECU 50 controls the rotation speed of the water pump 31 to the fourth rotation speed when the retarder 30 is being actuated (when it is on).

The first rotation speed is less than the fourth rotation speed (i.e., the first discharge flow rate<the fourth discharge flow rate). In other words, the minimum rotation speed of the water pumps 11b to 14b is less than the rotation speed of the water pump 31 when the retarder 30 is operating. Also, the second rotation speed is greater than the third rotation speed (i.e., the second discharge flow rate>the third discharge flow rate). In other words, the minimum rotation speed of the water pump 31 is less than the rotation speed of the water pumps 11b to 14b when the retarder 30 is not operating.

Figure 3:
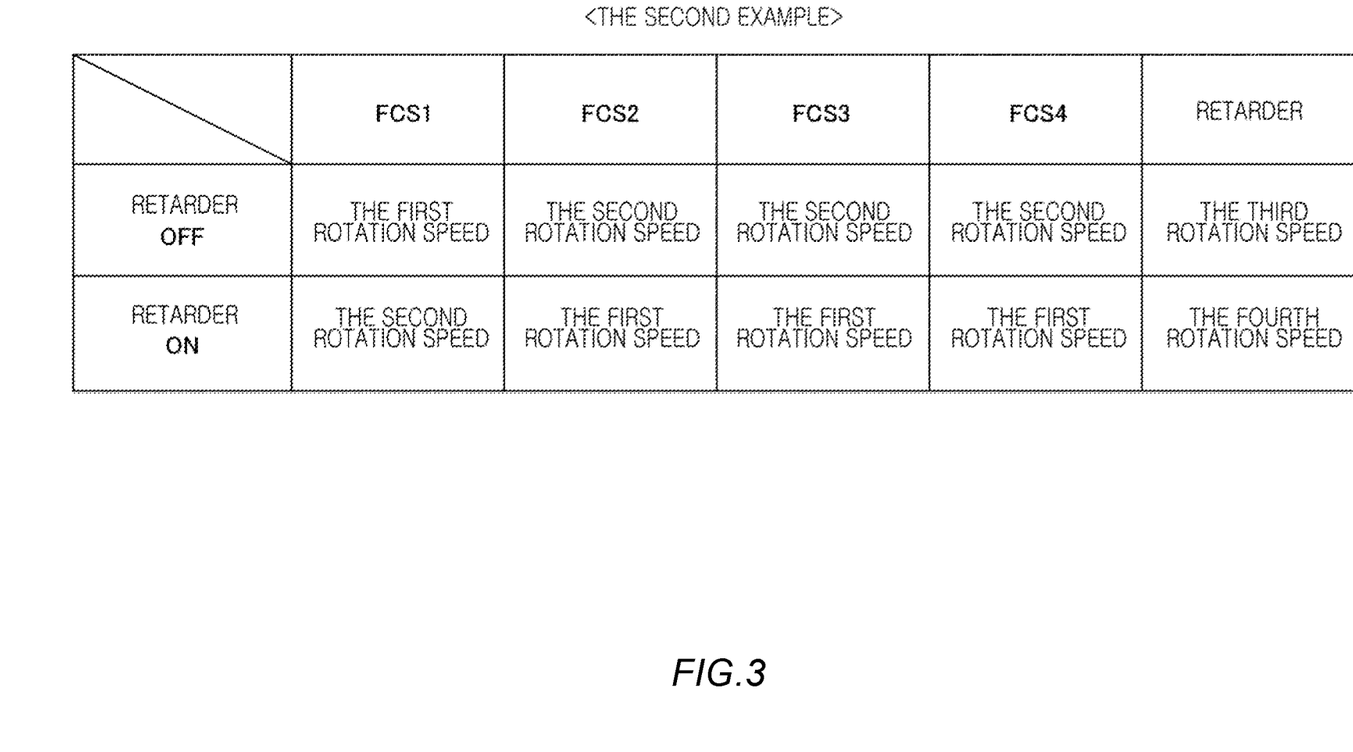
FIG. 3 is a diagram that shows the second example of each fuel cell system 11 to 14 and the rotation speed control of a water pump of a retarder 30 in the first embodiment.

FIG. 3 is a diagram that shows the second example of each fuel cell system 11 to 14 and the rotation speed control of a water pump of a retarder 30 in the first embodiment. The second example is an example in which the fuel cell system 11 is independently controlled and the fuel cell systems 12 to 14 are collaboratively controlled. Collaborative control is a control to operate water pumps of a plurality of fuel cell systems in a unified rotation speed. By collaboratively controlling a plurality of fuel cell systems, the amount of coolant fluid flowing from the plurality of fuel cell systems into the bypass flow channel 43, and the amount of coolant fluid flowing from the plurality of fuel cell systems to the bypass flow channel 42 can be made equal, allowing the prevention of the counterflow of coolant fluid. In the second example, when the retarder 30 is not being actuated, the fuel cell systems 12 to 14 are actuated and the fuel cell system 11 is not actuated. Also, when the retarder 30 is being actuated, the fuel cell system 11 is actuated and the fuel cell systems 12 to 14 are not actuated.

As shown in FIG. 3, the master FCECU 50 controls the rotation speed of the water pumps 12b to 14b to the second rotation speed when the retarder 30 is not being actuated. On the other hand, the master FCECU 50 controls the rotation speed of the water pump 11b to the first rotation speed when the retarder 30 is not being actuated. The master FCECU 50 controls the rotation speed of the water pump 31 to the third rotation speed when the retarder 30 is not being actuated.

The master FCECU 50 controls the rotation speed of the water pumps 12b to 14b to the first rotation speed when the retarder 30 is being actuated. On the other hand, the master FCECU 50 controls the rotation speed of the water pump 11b to the second rotation speed when the retarder 30 is being actuated. The master FCECU 50 controls the rotation speed of the water pump 31 to the fourth rotation speed when the retarder 30 is being actuated.

Figure 4:
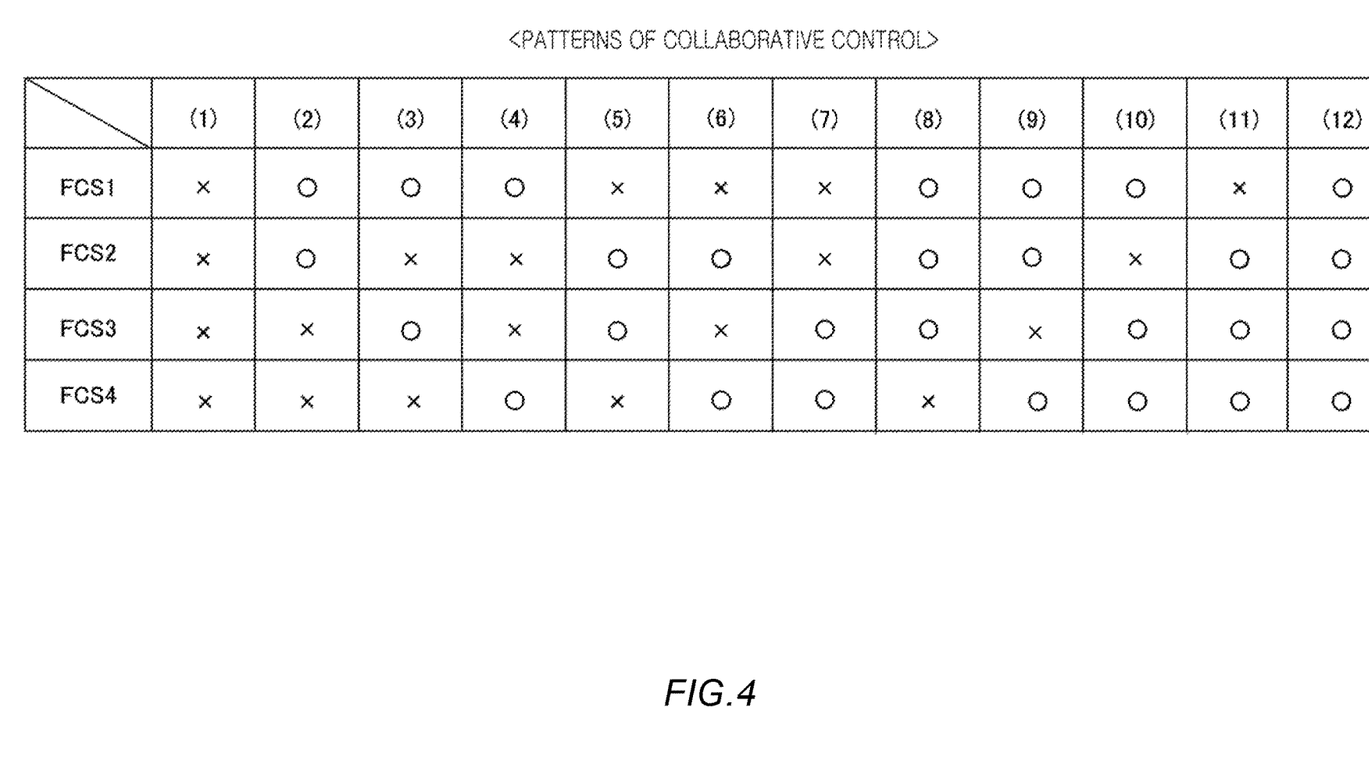
FIG. 4 is a diagram that shows patterns of collaborative control in the first embodiment.

FIG. 4 is a diagram that shows patterns of collaborative control in the first embodiment. In FIG. 4, "0" indicates a fuel cell system to be collaboratively controlled and "x" indicates a fuel cell system not to be collaboratively controlled. As shown in FIG. 4, there are twelve patterns in the ways to collaboratively control each fuel cell system 11 to 14. The pattern (12) is an example to collaboratively control all the fuel cell systems 11 to 14, and is the first example (see FIG. 2) in the first embodiment. The pattern (11) is an example to independently control the fuel cell system 11 and collaboratively control the fuel cell systems 12 to 14, and is the second example (see FIG. 3) in the first embodiment. Other patterns shown in FIG. 4 may be used to collaboratively control each fuel cell system 11 to 14.

Whether or not a certain fuel cell system becomes subject to be collaboratively controlled may be determined according to the open and closed state of the thermo valve in the fuel cell system. In this case, the fuel cell system in which the temperature of cooling water is higher than a predefined temperature and the thermo valve is in the open state may be collaboratively controlled. The fuel cell system in which the temperature of cooling water is lower than the predefined temperature and the thermo valve is in the closed state may be independently controlled.

Figure 5:
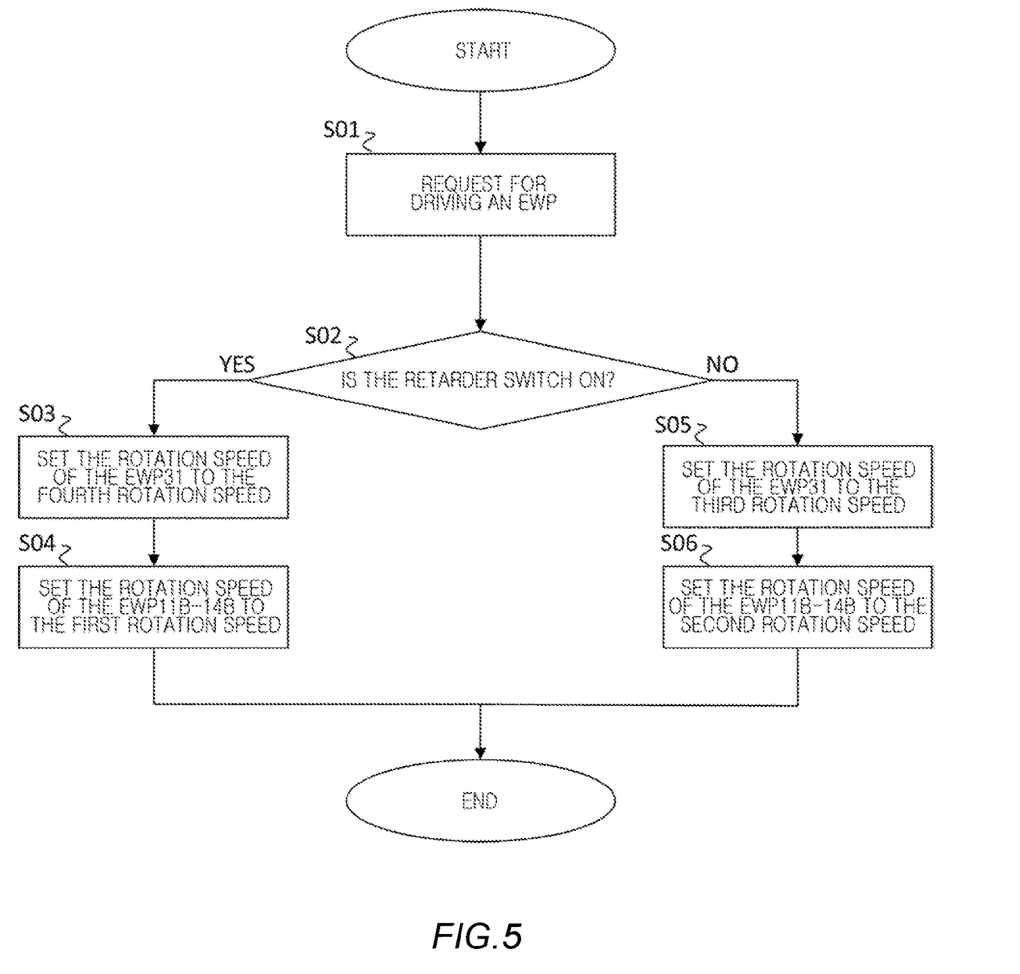
FIG. 5 is a flow chart that shows an operation of power system 100 in the first embodiment.

FIG. 5 is a flow chart that shows an operation of power system 100 in the first embodiment. When the master FCECU 50 issues the instruction to request for the drive of each water pump (step S01), whether the switch of the retarder 30 is on or off is determined (step S02). If the switch of the retarder 30 is on (step S02: YES), the rotation speed of the water pump 31 is set to the fourth rotation speed (step S03), and the rotation speed of the water pumps 11b to 14b is set to the first rotation speed (step S04). If the switch of the retarder 30 is off (step S02: NO), the rotation speed of the water pump 31 is set to the third rotation speed (step S05), and the rotation speed of the water pumps 11b to 14b is set to the second rotation speed (step S06).

According to the power system 100 in the first embodiment, in order to prevent the counterflow of coolant fluid, the rotation speed of the water pumps 11b to 14b of each fuel cell system 11 to 14, and the rotation speed of the water pump 31 of the retarder 30 are controlled. This eliminates a need to arrange a non-return valve to each fuel cell system 11 to 14 respectively for preventing the counterflow of coolant fluid, and can reduce the production costs of the power system 100. Furthermore, troubles, such as dew condensation or desiccation, following the counterflow of coolant fluid can be prevented. Furthermore, the fuel efficiency of the power system 100 can be enhanced.

Figure 6:
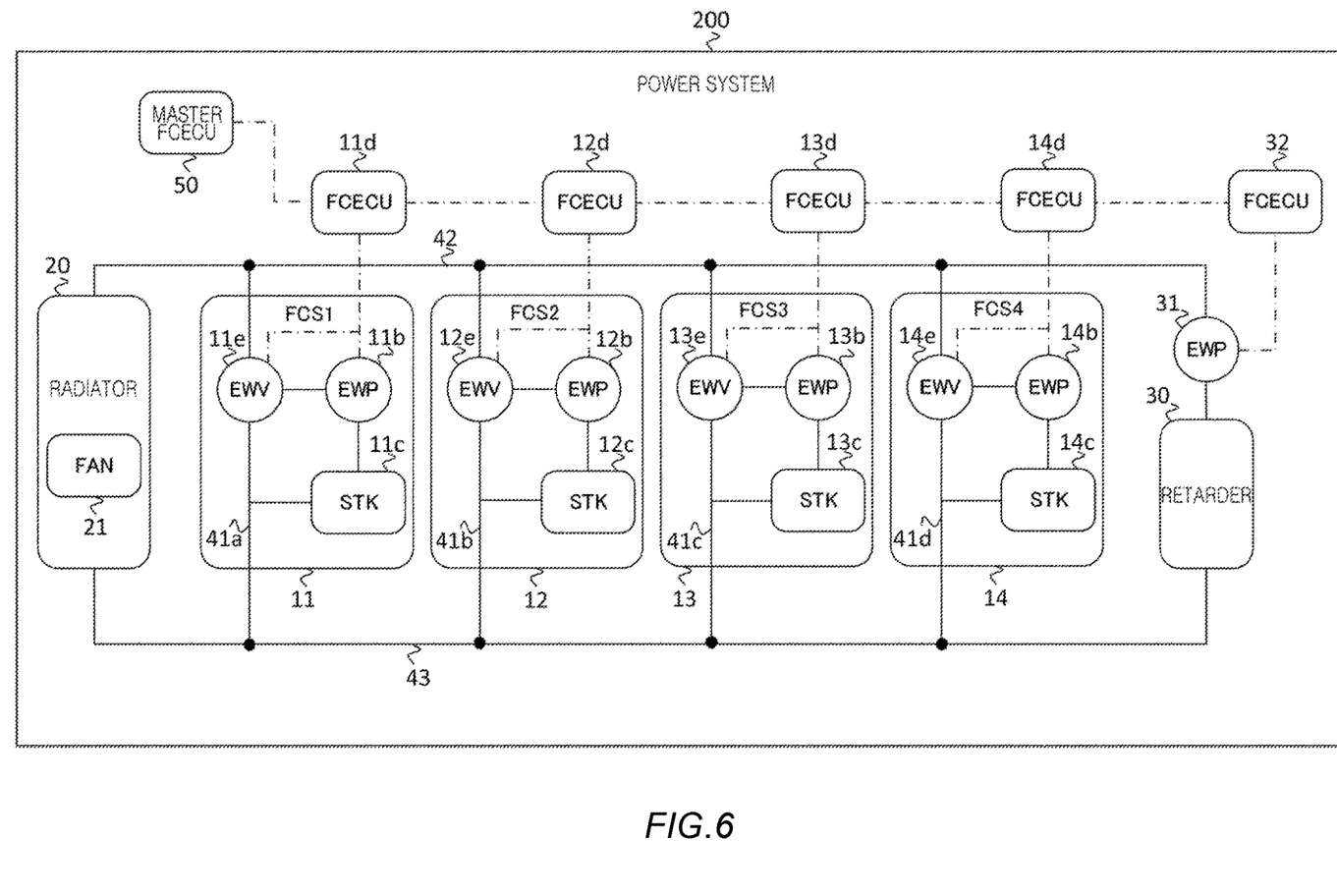
FIG. 6 is a diagram that shows a schematic configuration of power system 200 in the second embodiment.

FIG. 6 is a diagram that shows a schematic configuration of power system 200 in the second embodiment. Hereinafter, only the configurations which differ from the first embodiment in the second embodiment will be described and the descriptions for the configurations identical to the first embodiment are omitted by labeling identical reference numerals. The power system 100 in the second embodiment has magnetic valves (EWV) 11e to 14e instead of the thermo valves 11a to 14a. The magnetic valves 11e to 14e are respectively connected to the FCECUs 11d to 14d, and the opening and closing of the magnetic valves 11e to 14e are controlled in response to the instruction from the master FCECU 50. The master FCECU 50 controls, to the closed state, the magnetic valves 11e to 14e of the fuel cell system not to be actuated out of each fuel cell system 11 to 14, and controls, to the open state, the magnetic valves 11e to 14e of the fuel cell system to be actuated.

Figure 7:
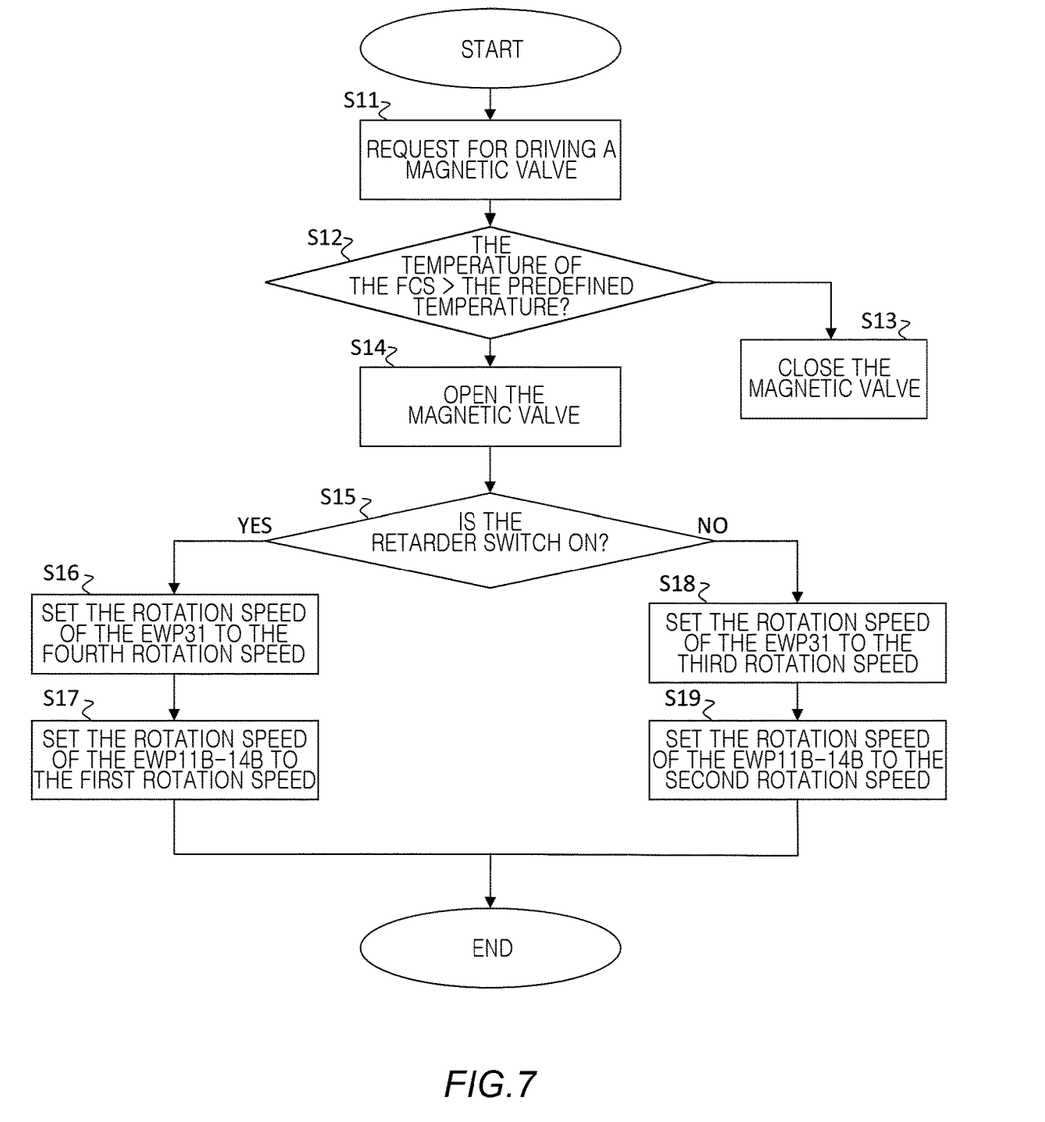
FIG. 7 is a flow chart showing an operation of power system 200 in the second embodiment.

FIG. 7 is a flow chart showing an operation of power system 200 in the second embodiment. If the master FCECU 50 issues the instruction to request for the drive of the magnetic valves 11e to 14e (step S11), whether the temperature of each fuel cell system 11 to 14 is higher than a predefined temperature is determined (step S12). If the temperature of each fuel cell system 11 to 14 is higher than the predefined temperature (step S12: YES), the magnetic valves 11e to 14e are opened (step S14). If the temperature of each fuel cell system 11 to 14 is not higher than the predefined temperature (step S12: NO), the magnetic valves 11e to 14e are closed (step S13).

When the magnetic valves 11e to 14e are opened, whether the switch of the retarder 30 is on or off is determined (step S15). If the switch of the retarder 30 is on (step S15: YES), the rotation speed of the water pump 31 is set to the fourth rotation speed (step S16), and the rotation speed of the water pumps 11b to 14b is set to the first rotation speed (step S17). If the switch of the retarder 30 is off (step S15: NO), the rotation speed of the water pump 31 is set to the third rotation speed (step S18), and the rotation speed of the water pumps 11b to 14b is set to the second rotation speed (step S19).

According to the power system 200 in the second embodiment, the effect is similar to that of the power system 100 in the first embodiment.

According to the power system 200 in the second embodiment, the magnetic valves 11e to 14e are employed for the valves of the fuel cell systems 11 to 14. As in the first embodiment, when the thermo valves 11a to 14a are used, the thermos valves 11a to 14a open and close according to the temperature of cooling water, and thus the method to control the internal pressure in the cooling passages completely depends on the temperature of cooling water. However, the use of the magnetic valves 11e to 14e allows the control of opening and closing the valves on the conditions other than the temperature of cooling water, and allows the control of the pressure in the cooling passages. Also, the use of the magnetic valves 11e to 14e allows the immediate delivery of the instruction to control the internal pressure in the cooling passages to the magnetic valves 11e to 14e so as to instantly open and close the valves.

Figure 8:
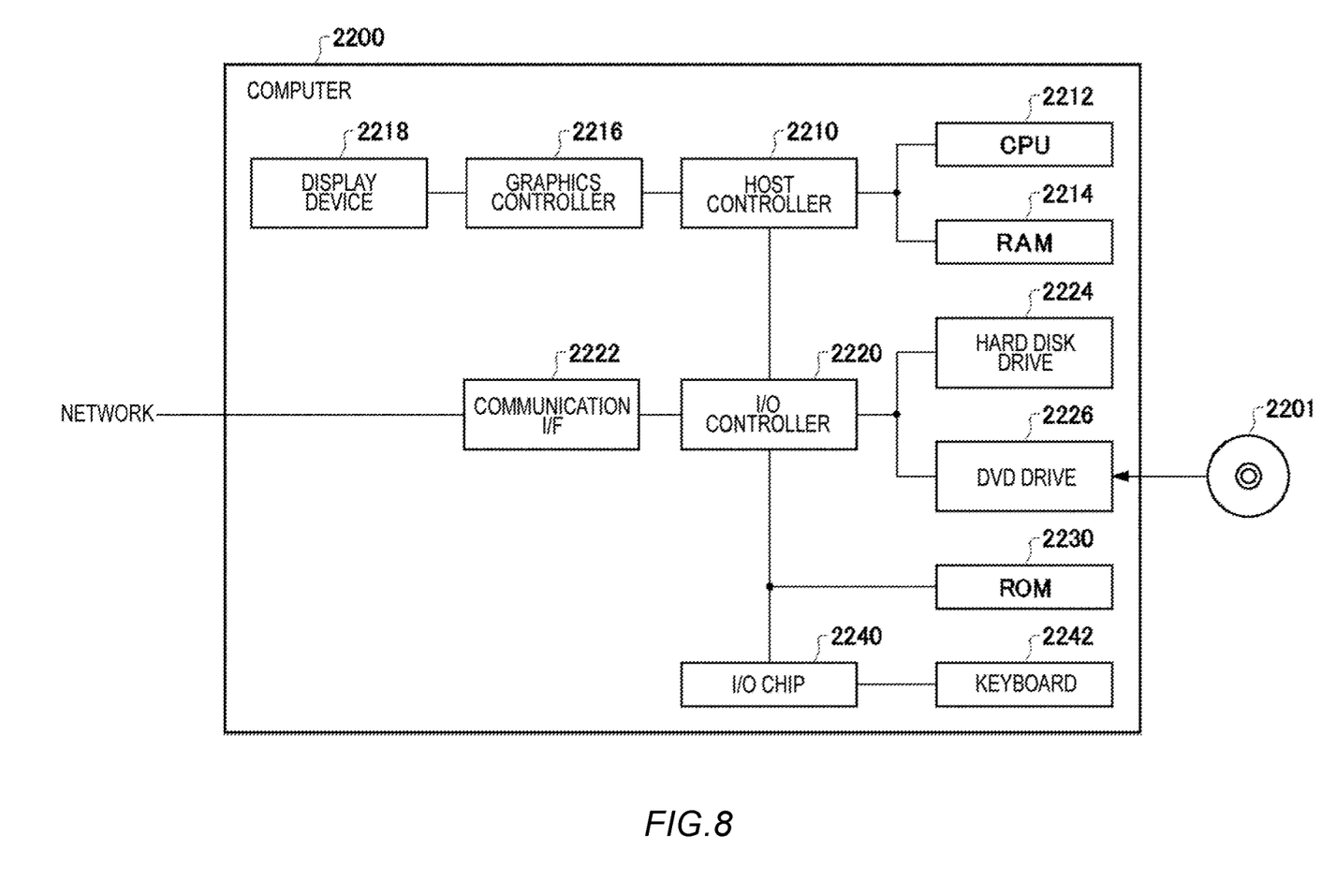
FIG. 8 shows an example of a computer 2200.

FIG. 8 shows an example of a computer 2200 in which multiple aspects of the present invention may be wholly or partly embodied. A program that is installed in the computer 2200 can cause the computer 2200 to function as or perform manipulations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain manipulations associated with some or all of the blocks of flow charts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication connect 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 works according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication connect 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, or the like to the input/output controller 2220.

A program is provided by computer readable medium such as the DVD-ROM 2201 or the IC card. The program is read from the computer readable medium, installed into the hard disk drive 2224, RAM 2214, or ROM 2230, which are also examples of computer readable medium, and executed by the CPU 2212. The information processing described in these programs is read into the computer 2200, resulting in cooperation between a program and the above-mentioned various types of hardware resources. An apparatus or method may be constituted by realizing the manipulation or processing of information in accordance with the usage of the computer 2200.

For example, when communication is performed between the computer 2200 and an external device, the CPU 2212 may execute a communication program loaded onto the RAM 2214 to instruct communication processing to the communication connect 2222, based on the processing described in the communication program. The communication connect 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predefined condition.

The above-described program or software modules may be stored in the computer readable medium on or near the computer 2200. In addition, a recording medium such as a hard disk or a RAM provided in a server system connected to a dedicated communication network or the Internet can be used as the computer readable medium, thereby providing the program to the computer 2200 via the network.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

REFERENCE SIGNS LIST 11 to 14 fuel cell system, 11a to 14a thermo valve, 11b to 14b water pump, 11c to 14c fuel cell stack, 20 radiator, 30 retarder, 11d to 14d FCECU, 31 FCECU, 41a to 41d main flow channel, 42, 43 bypass flow channel, 100 power system, 50 master FCECU

What is claimed is:
1. A power system, comprising:
one or more fuel cell systems each having a fuel cell stack and a fuel cell water pump;
a heat source having a heat source water pump and configured to be actuated to generate heat;
a heat radiator for exchanging heat with an atmosphere;
a cooling passage thermally connecting the one or more fuel cell systems, the heat source, and the heat radiator; and
a controller for controlling the one or more fuel cell systems, the heat source, and the heat radiator, wherein the controller is configured to:
control a rotation speed of the fuel cell water pump of each of the one or more fuel cell systems by switching between a rotation speed leading to a first discharge flow rate, which is a minimum discharge flow rate per a predefined unit time for the fuel cell water pump of each of the one or more fuel cell systems, and a rotation speed leading to a second discharge flow rate, which is greater than the first discharge flow rate; and
control a rotation speed of the heat source water pump by switching between a rotation speed leading to a third discharge flow rate, which is a minimum discharge flow rate per a predefined unit time for the heat source water pump, and a rotation speed leading to a fourth discharge flow rate, which is greater than the third discharge flow rate; wherein
the first discharge flow rate of the fuel cell water pump of each of the one or more fuel cell systems is less than the fourth discharge flow rate, and the second discharge flow rate of the fuel cell water pump of each of the one or more fuel cell systems is greater than the third discharge flow rate.

2. The power system according to claim 1, wherein
each of the one or more fuel cell systems further comprises a main flow channel and a valve,
wherein when the valve of a corresponding one of the one or more fuel cell systems is in an open state, coolant fluid flows into the corresponding one of the one or more fuel cell systems and passes through the fuel cell water pump and the fuel cell stack of the corresponding one of the one or more fuel cell systems and flows out to an exterior of the corresponding one of the one or more fuel cell systems, and
the cooling passage comprises a bypass flow channel, wherein when the valve of the corresponding one of the one or more fuel cell systems is in a closed state, the coolant fluid circulates outside of the corresponding one of the one or more fuel cell systems.

3. The power system according to claim 2, wherein
the controller is configured to control the rotation speed of the fuel cell water pump of the corresponding one of the one or more fuel cell systems based on at least one of an actuation state of the corresponding one of the one or more fuel cell systems, an actuation state of the heat source, and the open and closed state of the valve of the corresponding one of the one or more fuel cell systems.

4. The power system according to claim 2, wherein
the controller is configured to:
control, when the heat source is not being actuated, the rotation speed of the fuel cell water pump of each of the one or more fuel cell systems to a speed leading to the second discharge flow rate in the fuel cell water pump of each of the one or more fuel cell systems, and controls the rotation speed of the heat source water pump to a speed leading to the third discharge flow rate in the heat source water pump, and
control, when the heat source is being actuated, the rotation speed of the fuel cell water pump of each of the one or more fuel cell systems to a speed leading to the first discharge flow rate in the fuel cell water pump of each of the one or more fuel cell systems, and controls the rotation speed of the heat source water pump to a speed leading to the fourth discharge flow rate in the heat source water pump.

5. The power system according to claim 2, wherein the one or more fuel cell systems comprise a plurality of the fuel cell systems, wherein
the plurality of the fuel cell systems and the heat source are parallelly connected on the cooling passage, respectively.

6. The power system according to claim 5, wherein
the controller is configured to:
determine a number of the plurality of the fuel cell systems that need to be actuated according to an output requested by the power system,
control, when the heat source is not being actuated, the rotation speed of the fuel cell water pump of each of the plurality of the fuel cell systems that are not to be actuated to a speed leading to the first discharge flow rate in the fuel cell water pump of each of the plurality of the fuel cell systems that are not to be actuated, controls the rotation speed of the fuel cell water pump of each of the plurality of the fuel cell systems that need to be actuated to a speed leading to the second discharge flow rate in the fuel cell water pump of each of the plurality of the fuel cell systems that need to be actuated, and controls the rotation speed of the heat source water pump to a speed leading to the third discharge flow rate in the heat source water pump, and control, when the heat source is being actuated, the rotation speed of the fuel cell water pump of each of the plurality of the fuel cell systems that need to be actuated to one of the speed leading to the first discharge flow rate and the speed leading to the second discharge flow rate, and controls the rotation speed of the heat source water pump to a speed leading to the fourth discharge flow rate in the heat source water pump.

7. The power system according to claim 6, wherein
the controller is configured to
control, when the heat source is being actuated, the rotation speed of the fuel cell water pump of each of the plurality of the fuel cell systems that are not to be actuated to the speed leading to the first discharge flow rate in the fuel cell water pump of each of the plurality of the fuel cell systems that are not to be actuated, and controls the rotation speed of the fuel cell water pump of each of the plurality of the fuel cell systems that need to be actuated to the speed leading to the second discharge flow rate in the fuel cell water pump of each of the plurality of the fuel cell systems that need to be actuated.

8. The power system according to claim 7, wherein
the controller is configured to
control the fuel cell water pump of each of the plurality of the fuel cell systems to the rotation speed leading to the first discharge flow rate when the valve of a corresponding one of the plurality of the fuel cell systems is in the closed state, and to the rotation speed leading to the second discharge flow rate when the valve of the corresponding one of the plurality of the fuel cell systems is in the open state.

9. The power system according to claim 5, wherein
the valve of each of the plurality of the fuel cell systems is a magnetic valve, opening and closing of which can be controlled by the controller, and
the controller is configured to
control, out of the plurality of the fuel cell systems, the valve of each of the plurality of the fuel cell systems that are not to be actuated to the closed state, and the valve of each of the plurality of the fuel cell systems that need to be actuated to the open state.

10. A vehicle, comprising the power system according to claim 1, wherein the heat source is a retarder.

11. A power system, comprising:
one or more fuel cell systems each having a fuel cell stack and a fuel cell water pump;
a heat source having a heat source water pump and configured to be actuated to generate heat;
a heat radiator for exchanging heat with an atmosphere;
a cooling passage thermally connecting the fuel cell system, the heat source, and the heat radiator; and
a controller for controlling the one or more fuel cell systems, the heat source, and the heat radiator wherein
the controller is configured to:
control a rotation speed of the fuel cell water pump of each of the one or more fuel cell systems according to a temperature of a corresponding one of the one or more fuel cell systems, within a range that does not go below a first minimum discharge flow rate per a predefined unit time,
control, when the heat source is not being actuated, a rotation speed of the heat source water pump for each discharge flow rate per unit time of the fuel cell water pump of each of the one or more fuel cell systems, within a range that does not go below a second predefined minimum discharge flow rate,
control, when the heat source is being actuated, a rotation speed of the heat source water pump according to a temperature of the heat source.

12. The power system according to claim 11, wherein the controller is configured to control the rotation speed of the fuel cell water pump of each of the one or more fuel cell systems based on at least one of an actuation state of the corresponding one of the one or more fuel cell systems, an actuation state of the heat source, and an open and closed state of a valve of the corresponding one of the one or more fuel cell systems.

13. The power system according to claim 12, wherein
the one or more fuel cell systems comprise a plurality of the fuel cell systems,
the valve of each of the plurality of the fuel cell systems is a magnetic valve, opening and closing of which can be controlled by the controller, and
the controller is configured to
control, out of the plurality of the fuel cell systems, the valve of each of the plurality of the fuel cell systems that are not to be actuated to the closed state, and the valve of each of the plurality of the fuel cell systems that need to be actuated to the open state.

14. The power system according to claim 11, wherein the one or more fuel cell systems comprise a plurality of the fuel cell systems, wherein
the plurality of the fuel cell systems and the heat source are parallelly connected on the cooling passage, respectively.

15. A vehicle, comprising the power system according to claim 11, wherein the heat source is a retarder.

16. A control method for a power system, wherein the power system comprises:
one or more fuel cell systems each having a fuel cell stack and a fuel cell water pump;
a heat source having a heat source water pump and configured to be actuated to generate heat;
a heat radiator for exchanging heat with an atmosphere;
a cooling passage thermally connecting the one or more fuel cell systems, the heat source, and the heat radiator; and
a controller for controlling the one or more fuel cell systems, the heat source, and the heat radiator; wherein
the controller performs the steps of:
controlling a rotation speed of the fuel cell water pump of each of the one or more fuel cell systems by switching between a rotation speed leading to a first discharge flow rate, which is a minimum discharge flow rate per a predefined unit time for the fuel cell water pump of each of the one or more fuel cell systems, and a rotation speed leading to a second discharge flow rate, which is greater than the first discharge flow rate; and
controlling a rotation speed of the heat source water pump by switching between a rotation speed leading to a third discharge flow rate, which is a minimum discharge flow rate per a predefined unit time for the heat source water pump, and a rotation speed leading to a fourth discharge flow rate, which is greater than the third discharge flow rate; wherein
the first discharge flow rate is less than the fourth discharge flow rate, and the second discharge flow rate is greater than the third discharge flow rate.

17. The control method for the power system according to claim 16, wherein
each of the one or more fuel cell systems further comprises a main flow channel and a valve,
wherein when the valve of a corresponding one of the one or more fuel cell systems is in an open state, coolant fluid flows into the corresponding one of the one or more fuel cell systems and passes through the fuel cell water pump and the fuel cell stack of the corresponding one of the one or more fuel cell systems and flows out to an exterior of the corresponding one of the one or more fuel cell systems, and
the cooling passage comprises a bypass flow channel, wherein when the valve of the corresponding one of the one or more fuel cell systems is in a closed state, the coolant fluid circulates in the exterior of the corresponding one of the one or more fuel cell systems.

18. The control method for the power system according to claim 17, wherein
the controller is configured to control the rotation speed of the fuel cell water pump of each of the one or more fuel cell systems based on at least one of an actuation state of a corresponding one of the one or more fuel cell systems, an actuation state of the heat source, and the open and closed state of the valve of the corresponding one of the one or more fuel cell systems.

19. The control method for the power system according to claim 16, wherein the one or more fuel cell systems comprise a plurality of the fuel cell systems, wherein
the plurality of the fuel cell systems and the heat source are parallelly connected on the cooling passage, respectively.

20. A vehicular power control method, comprising the control method for the power system according to claim 16, wherein the heat source is a retarder.

* * * * *